United States Patent
Jimenez Arreola et al.

(10) Patent No.: US 9,306,929 B2
(45) Date of Patent: Apr. 5, 2016

(54) VERTICAL SOCIAL NETWORK

(71) Applicant: Orange, Paris (FR)

(72) Inventors: Teresa Jimenez Arreola, London (GB); Fanny Monier, London (GB)

(73) Assignee: Orange, Paris (FR)

(*) Notice: Subject to any disclaimer, the term of this patent is extended or adjusted under 35 U.S.C. 154(b) by 0 days.

(21) Appl. No.: 14/274,164

(22) Filed: May 9, 2014

(65) Prior Publication Data

US 2014/0344895 A1  Nov. 20, 2014

(30) Foreign Application Priority Data

May 16, 2013  (EP) .................................... 13305631

(51) Int. Cl.
*H04L 29/06* (2006.01)
*G06Q 10/02* (2012.01)
*G06Q 10/10* (2012.01)
*G06Q 50/00* (2012.01)
*H04L 29/08* (2006.01)

(52) U.S. Cl.
CPC .............. *H04L 63/08* (2013.01); *G06Q 10/02* (2013.01); *G06Q 10/1091* (2013.01); *G06Q 50/01* (2013.01); *H04L 67/18* (2013.01)

(58) Field of Classification Search
CPC .............. G06Q 10/02; G06Q 10/1091; G06Q 10/1093; G06Q 50/01; H04L 63/08; H04L 67/18
USPC ............................................................ 726/4
See application file for complete search history.

(56) References Cited

U.S. PATENT DOCUMENTS

| | | | |
|---|---|---|---|
| 2009/0215469 A1* | 8/2009 | Fisher et al. ................ | 455/456.3 |
| 2012/0047147 A1* | 2/2012 | Redstone et al. ............ | 707/748 |
| 2013/0029685 A1 | 1/2013 | Moshfeghi | |
| 2014/0067901 A1* | 3/2014 | Shaw et al. .................. | 709/201 |

OTHER PUBLICATIONS

Extended European Search Report dated Sep. 20, 2013 for corresponding European Patent Application No. 13305631.7, filed May 16, 2013.
Q. Li et al.: "Mining user similarity based on location history", ACM SIGSPATIAL GIS 2008, ACM).

* cited by examiner

*Primary Examiner* — Yogesh Paliwal
(74) *Attorney, Agent, or Firm* — David D. Brush; Westman, Champlin & Koehler, P.A.

(57) ABSTRACT

A method is provided to manage access to a social network from a mobile device, which has a user ID. The method is executed by a server, which manages accesses for a plurality of social networks, each social network being associated with a location and a time window. The method includes: receiving a request from the mobile device to join a social network, the request comprising at least information on the location of the mobile device and the user ID; gathering a timestamp associated with the received request; retrieving at least one social network associated with the location of the mobile device and a time window comprising the time indicated by the timestamp and registering the user ID in association to the at least one social network.

12 Claims, 4 Drawing Sheets

VERTICAL SOCIAL NETWORK

FIELD OF THE PRESENT SYSTEM

The present invention relates generally to managing access to a social network from a mobile device.

BACKGROUND OF THE PRESENT SYSTEM

A social networking service is a platform to build social networks or social relations among people who, share interests, activities, backgrounds or real-life connections. A social network service consists of a representation of each user (often a profile), his social links, and a variety of additional services. Social networking is web-based services that allow individuals to create a public profile, to create a list of users with whom to share connection, and view and cross the connections within the system. Most social network services are web-based and provide means for users to interact over the Internet, such as e-mail and instant messaging. Social network sites are varied and they incorporate new information and communication tools such as, mobile connectivity, photo/video/sharing and blogging (Wikipedia).

In recent years the amount of people in the world who use online social network channels to communicate has increased exponentially. Online Social networks are the virtual representation of social structures comprised by people who build relationships. Traditional online social network websites reflect the accumulation of acquaintances a person gathers in the course of his life. They have an open membership approach which allows any people to join the community gathered by the social network regardless their interests, believes, or points of view.

On the other hand, in recent years, there has been a peak on the emergence of online social network websites which are topic-oriented. Allowing people sharing same interests to meet and exchange information.

With all this in mind, the amount of social data generated, meaning the content shared on social networks, the diversity of the sources and tools, as well as the need to have a "smarter management" of the information being published, pose big challenges for the IT community, in order to find new methods to filter and deliver relevant information in a more controlled and automatic way.

In particular, access control, or access management, to social network is a major challenge in order to achieve a smart management of the people participating and exchanging information within a social network, particularly when trying to build value-added communities of people.

Location is one of the most important components of user context, extensive knowledge about an individual's interests, behaviors, and relationships with others can be learned from her locations (Q. Li, Y. Zheng, X. Xie and W.-Y. Ma, *Mining user similarity based on location history*, in ACM SIGSPATIAL GIS 2008, ACM). Thus, using geo-location techniques, such as GPS, or others geo-location services, some social networks add today a location component to create value. One of the most popular social networks that use geo-location is Foursquare™, where the users can "check in" digitally in physical places and communicate with other users sharing the same location.

However, users of a social network using geo-location to improve communities' creation or management may still face some disappointments. Indeed, existing techniques are unable to distinguish between a user of a social network "checking in" a said location, like a stadium for example, but in reality assisting to two totally uncorrelated events. People going to a same stadium, but one to assist to a football match, the other to assist to a concert, may not share same interests. Thus, location management of a social network access fails to create coherent communities of user within a social network.

Indeed, there is still a need today to improve the access management of social networks in order to create more value-added communities of interest among users of these social networks.

SUMMARY OF THE PRESENT SYSTEM

The present system relates to a method to manage access to a social network from a mobile device, said mobile device comprising an user ID, the method being executed by a server, said server managing the accesses for a plurality of social networks, each social network being associated with a location and a time window, the method comprising the steps of receiving a request from the mobile device to join a social network, said request comprising at least information on the location of the mobile device and the user ID, gathering a timestamp associated with the received request, retrieving at least one social network associated with the location of the mobile device and a time window comprising the time indicated by the timestamp and registering the user ID in association to the at least one social network.

This method advantageously allows controlling the registration to a social network, the control being based on location and time information. Indeed, request to join a social network received by the server, depending on location of the mobile device and timestamp associated with the received request, will permit registration of the user ID associated to a first social network. Thus, only people requesting to join a social network using their mobile device at a given place, for example a conference center, and during a certain time frame, for example during a certain day, will be registered at the social network dedicated to the conference this same day at the conference center. In this example, this method also advantageously suppress the need to collect and/or maintain a list of attendees to the conference, and further the step of registration of this list of people to a social network as registration to the dedicated social network is only based on location and time.

In a complementary embodiment of present system, access to a given social network from the mobile device is authorized if the user ID of the mobile device is registered in association to the given social network.

Advantageously, access to a social network is permitted based on the previously described step of registration. Indeed, only registered people would be able to access the social network, thus limiting the access to the social network to people being at a certain location during a certain timeframe. Thus, if someone who attended a conference and registered to a social network related to the said conference using present invention method wants to later access the same social network, the system, i.e. the server implementing the method, would allow access to this person. As registration is only possible using the method, it prevents people not attending the conference (i.e. not sharing the same location & time) to register and thus access the social network.

In a further embodiment of present system, information on the location of the mobile device comprises information gathered by the mobile device from a Near Field Communication (NFC) tag.

In a particularly advantageous embodiment of the present system, location of the mobile device could be validated or facilitated using Near Field Communication technologies. Indeed, a mobile device comprising a NFC reader could retrieve information from a NFC tag, said NFC tag being, for example, installed next to the entrance of a conference room. Information retrieved could be either directly location information (such as embedded GPS position) or information sufficient for the system to retrieve the location from this information. For example, the NFC tag could deliver the information "Millenium Conference center, Building C, Floor 3, Room 42", allowing the system to directly retrieve the location. In another implementation, the NFC tag could deliver information in the form of an ID, the system being able to make the correspondence between such ID and a defined location.

In an alternative embodiment of present system, information on the location of the mobile device comprises information gathered by the mobile device using geo-location techniques.

Advantageously, to determine the location of the mobile device, geo-location techniques allow the mobile to be independent from external devices such as NFC tag. Moreover, NFC readers are nowadays not so common on mobile devices. Thus, the mobile device can rely on geo-location techniques such as GPS devices, embedded or not within the mobile device. Using geo-location techniques participates also to an advantageous embodiment of the system, not depending on any user interaction. Indeed, the user does not need to move its mobile device next to a NFC tag. Thus, the mobile device can, possibly automatically and/or periodically send request to register to a social network, getting automatic registration to social networks corresponding to the criteria of location and time frame of the request.

In a complementary embodiment of present system, the act of gathering the timestamp comprises the acts of retrieving information in the received request from the mobile device, the information being gathered by the mobile device from a NFC tag and determining a timestamp from the retrieved information.

Advantageously, the request sent from the mobile device may comprise information gathered by the mobile device from a NFC tag. Said information can be frequently updated by the NFC tag, meaning here that the NFC tag can be dynamically updated, implying that in this case the NFC tag needs to be somehow active, or at least possibly updated by another device. Thus, the NFC tag can provide up to date information, possibly encoded, to the mobile device comprising a NFC reader. The server can, possibly after a prior act of decoding, get the timestamp from the received information. This is particularly advantageous as to limit possibility of fraud or modification of the timestamp possibly sent by the mobile user in order to get register to a social network out of the authorized time windows.

This is also quite advantageous to un-correlate the act of the check-in against a NFC tag, for example when entering a conference room and the act of actually sending the request to the server, if for example there is no network coverage inside the conference room. Thus, the request can be put on-hold by the mobile device and sent when network connectivity is retrieved. The server, when receiving the request, would retrieve the timestamp from the request, possibly decoding some information, and use said timestamp instead of the current time of the sending or the receiving of the request, to determine which social network time window correspond to the retrieved timestamp.

In a complementary embodiment of present system, the method according to any previous claim, further comprising an act of associating a user profile to the received request from the mobile device, the user profile being associated to the user ID.

Advantageously, a user profile is associated to the user ID of the mobile device, allowing the user of the mobile device to be registered within a social network with personalized information, such as first name, last name, phone number, e-mail, title or any other relevant information.

In another complementary embodiment of present system, the method further comprises after the act of registering to a social network, the acts of sending a message to the mobile device, said message requesting for complementary information related to the social network, receiving a message from the mobile device, with request information and associating the received information with the user profile and the social network.

When talking about a social network relating to an event such as a conference, it could be quite advantageous for the people connecting to the social network to indicate if they are attendees or part of the speakers. When talking about a social network relating to a sport event such as a football match attendees may indicate which team they support. More generally speaking, users may personalize their registration to a given social network, possibly complementing an existing user profile with information in relation with the social network.

In another embodiment of present system, the method includes prior to the act of registering the user ID in association to the at least one social network, the acts of sending a list of at least some of the retrieved social network associated with the location of the mobile device to the mobile device, receiving a selection from the sent list of at least one social network from the mobile device and where the act of registering the user ID is done in association to the received selection of social network.

This is advantageous when several social networks correspond to the same criteria of location and timestamp. Indeed, the users may receive a list of available social network and choose the social network they want to register to. This could happen for example if a unique NFC tag is used in a conference center hosting several conferences at the same time or if the location technique used if not precise enough to distinguish between several places.

Finally, one object of the invention concerns a computer program, in particular computer programs on or in an information medium or memory, suitable for implementing the method for managing access to a social network from a mobile device object of the invention. These programs can use any programming language, and be in the form of source code, binary code, or of code intermediate between source code and object code such as in a partially compiled form, or in any other desirable form for implementing the methods according to the invention.

The information medium may be any entity or device capable of storing the program. For example, the medium can comprise a storage means, such as a ROM, for example a CD ROM or a microelectronic circuit ROM, or else a magnetic recording means, for example a diskette (floppy disk) or a hard disk.

BRIEF DESCRIPTION OF THE DRAWINGS

The invention is explained in further detail, and by way of example, with reference to the accompanying drawings wherein.

DETAILED DESCRIPTION OF THE PRESENT SYSTEM

The following are descriptions of illustrative embodiments that when taken in conjunction with the following drawings will demonstrate the above noted features and advantages, as well as further ones. In the following description, for purposes of explanation rather than limitation, illustrative details are set forth such as architecture, interfaces, techniques, element attributes, etc. However, it will be apparent to those of ordinary skill in the art that other embodiments that depart from these details would still be understood to be within the scope of the appended claims. Moreover, for the purpose of clarity, detailed descriptions of well known devices, circuits, tools, techniques and methods are omitted so as not to obscure the description of the present system. It should be expressly understood that the drawings are included for illustrative purposes and do not represent the scope of the present system. In the accompanying drawings, like reference numbers in different drawings may designate similar elements.

Figure 1A:
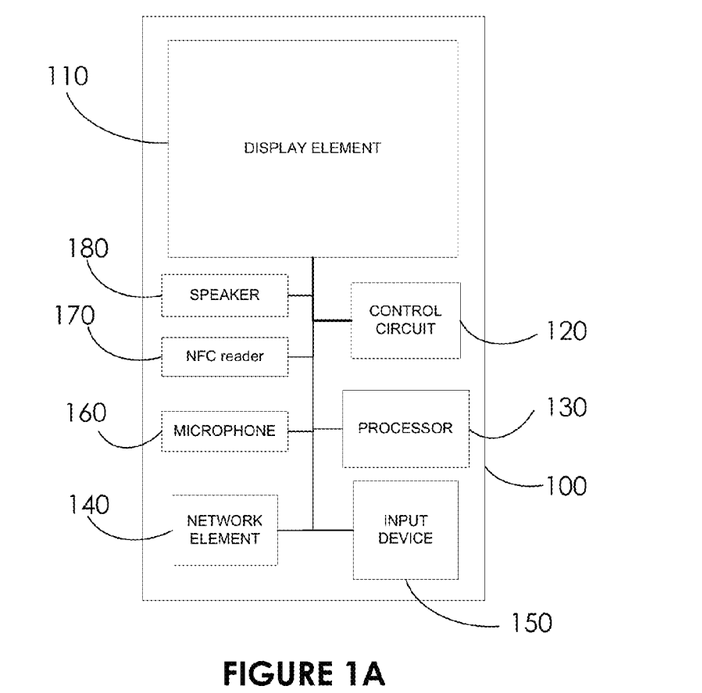
FIGS. 1A and 1B show an exemplary embodiment of a mobile device and a server in accordance with present system.

The method of present invention is implemented via applications executed respectively by the mobile device 100 or the server 190. For clarity sake, it should be understood that when writing "the mobile device does something" means "the application executed on the mobile device does something". Just like "the application does something" means "the application executed by the mobile device FIG. 1A is an illustration of an exemplary mobile device 100 used in the present system. The mobile device 100 comprises at least a display element 110, a control circuit 120, a processor 130, a network element 140, an input element 150, a microphone 160, a Near Field Communication (NFC) reader 170 and possibly a speaker 180.

Network element 140 may comprise various network modules allowing network connectivity of the mobile device 100. Network element 140 may include for example a Bluetooth module, a GSM module, or any module providing a network connectivity to the mobile device 100. In other words, the network element 140 is managing the connections between the mobile device 100 and a mobile network, and possibly other mobile devices, via network technologies such as, but not limited to, GSM, 3G, Wi-Fi, Bluetooth, and so on.

In the present system, the user interaction with and manipulation of the application program rendered on a GUI can be achieved using:
- the display element 110, or screen, which could be a touch panel;
- the input device 150 such as a key panel when available on the mobile device 100, or an external keyboard connected via the network element 140 (via Bluetooth connection for example).

Processor 130 may control the generation and the rendering of the GUI on the display element 110 (the information required to generate and manipulate the GUI resides entirely on the mobile device 100) or simply the rendering when the GUI is provided by a remote (i.e. network connected via network element 140) device (the information, including in some instances the GUI itself is retrieved via a network connection). However, advantageously, a control circuit 120 may be dedicated to such task of rendering the GUI on the display element 110. For simplicity sake, in the following description it will be considered that the sentence "the mobile device renders on the display element a GUI of an application program" should be understood either as "the processor of the mobile device renders on the display element a GUI of an application program" or "the control circuit of the mobile device on the display element a GUI of an application program" according to the way the mobile device 100 is implemented. The fact that the rendering on the display element is controlled either by the processor directly or by a control circuit depends on hardware constraints.

A Near Field Communication (NFC) reader 170 is available. The NFC reader allows the device to establish radio communication with other NFC enabled devices, by touching them together or bringing them into close proximity, usually no more than a few centimeters. Communication is also possible between the mobile device 100 and an unpowered NFC chip, called a "tag". The NFC tag can be considered as a passive device. The NFC reader 170 can retrieve information from a NFC tag by bringing the mobile device 100 close to the NFC tag.

Hereafter, description of the present system will focus on NFC technologies, but it should be understood that others technologies than NFC technologies may be used. More generally, Radio-frequency identification (RFID) technologies can be used in place or in complement of NFC technologies.

NFC technology can also be used in complement with other radio communications technologies such as Wi-Fi or Bluetooth technologies. For example, communication between the mobile device 100 and another electronic device can be set up using NFC technology, but actual data transfer between the two devices, after the setting-up of the communication, may rely on higher-speed technologies, like Wi-Fi or Bluetooth.

A microphone 160 can monitor or receive audio signals. Normally used to capture the voice of a user for voice application—e.g. phone—, the microphone 160 could also possibly receive ultrasound signal. The microphone 160 may be used in complement of the NFC reader 170. In an alternative embodiment of the present system, the microphone 160 may be used to detect continuous or periodic ultrasound signal emitted by a speaker located in a certain place.

A speaker 180 may advantageously be implemented in the mobile device 100. This speaker 180 can be used by voice application to render the voice of a correspondent for a phone application program, or to listen to music played by the mobile device. This speaker 180 may advantageously emit an ultrasound or any kind of sound according to application program instructions. Thus, in complement with the microphone 160, the speaker 180 may be used to establish two ways communications.

Additionally, the mobile device may advantageously possess a ge-olocation module like a Global Positioning System (GPS) receiver.

Figure 1B:
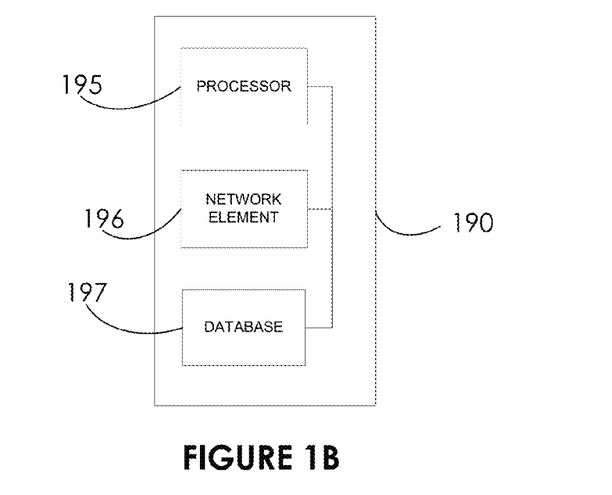

FIG. 1B is an illustration of an exemplary server 190 used in the present system. The server 190 comprises at least a processor 195, a network element 196 and possibly a database 197.

Database 197 may be hosted directly within the server 190, or may be hosted in another server or in the cloud, the server 190 accessing the database through the network element 196. Database 197 stores at least a plurality of social networks, each social network being associated with a location and a time window. Depending on the embodiment of present system, the database may also store location information in association with, for example, GPS coordinates, name of a places or a location ID.

In the present system, a user joining one social network will be associated to an identifier to a social network hosted by the database 197. Each social network may be described as a social structure made up of a set of users (such as individuals or organizations) and the dyadic ties—i.e. links—between these users. Its technical implementation corresponds to a graph structure defining relationships or links between a plurality of nodes, each node corresponding to an identifier for the user in the social network. The graph structure and the plurality of nodes correspond to entries in the database 197.

In one embodiment, the database 197 stores a plurality of NFC tag ID, each NFC tag ID being associated to a location.

Processor 195 may be used by the server to retrieve time, possibly synchronizing through the network element to a Network Time Protocol (NTP) server.

Figure 2:
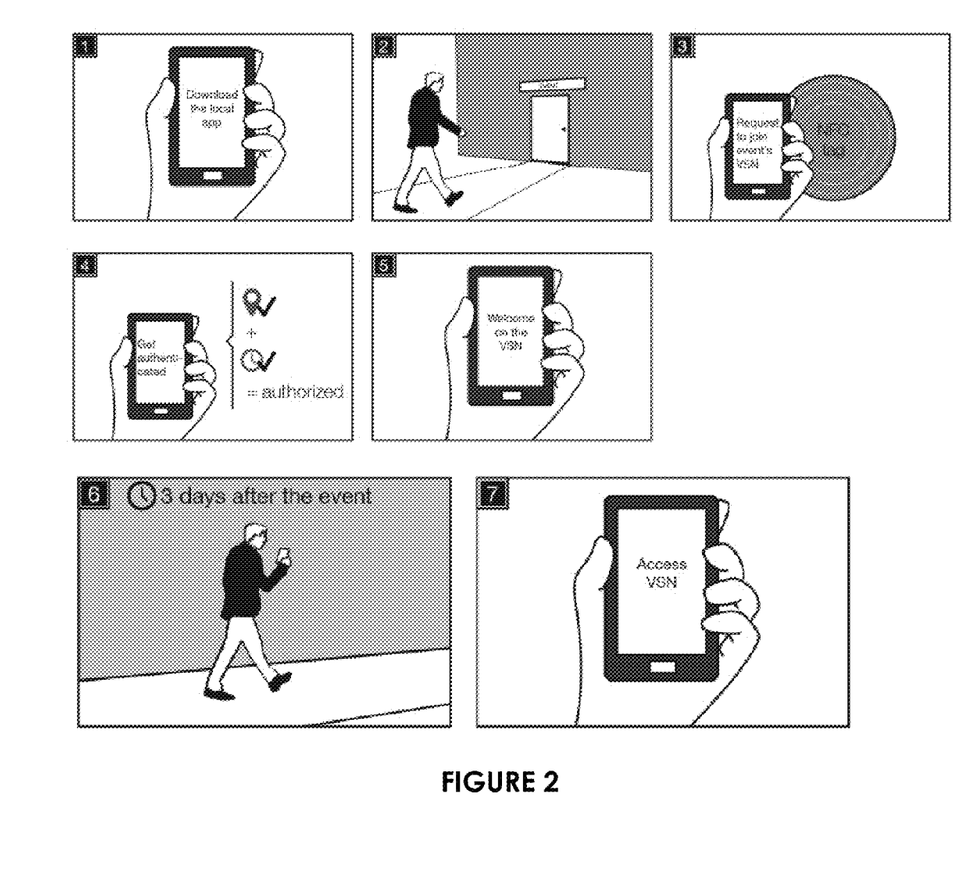
FIG. 2 shows an exemplary illustration of a use case of registration to a social network in accordance with an embodiment of the present system.

FIG. 2 shows an exemplary illustration of a use case of registration to a social network in accordance with an embodiment of the present system. In a first step as shown in box 1 of FIG. 2 (in short FIG. 2 (1)), the user needs to install an application—or computer program—to access social networks on the mobile device 100. Advantageously, the application could be pre-installed on the mobile device 100, for example by a network operator. But if not available, the user may need to look for the application on an application market such as Google Play™ or Itunes™ and then download the application. Information to download and install the application can possibly also be retrieved using, for example, a QR code or a NFC tag. Alternatively, the application can be installed on the mobile device 100 from any information medium or memory such as for example Secure Digital (SD) card. The step of installing the application comprises a step of associating a user identifier (ID) to the mobile device. This user ID could be randomly generated when installing the application, could be generated from, for example, a MAC address of a Wi-Fi interface of the mobile device (if any), or it could even be entered manually by the user during the installation process, or retrieved from a file, said file being stored either locally or on a distant server.

In FIG. 2 (2) at a certain date and time, the user attends an event, for example a conference, the event being hosted in a given conference center. This event or conference is also associated to a social network, said social network being associated with a location and a time window. For illustration purposes, the user attends the event at a time within the time windows associated to the social network associated with the event and located at the same location associated to the social network. The conference center, or possibly the conference room of the conference center, is associated to a NFC tag or reader installed advantageously next to the entrance. The exact nature of the information embedded in the NFC tag may depend on the embodiment of the present system, but in one embodiment, it could comprise, for example, Global Positioning System (GPS) coordinates of the location of the conference room, or of the reader itself, a location ID or the location name.

In FIG. 2 (3), the user has the mobile device 100 to execute or run the application previously installed on step (1). Depending on the implementation of the present system, the user may need to launch manually a request to join a social network, or, said request can be triggered automatically when the mobile device 100 detects a NFC tag using its NFC reader 170. In both cases, the application running on the mobile device 100 retrieves information from the NFC tag through the NFC reader 170 and sends a request to join a social network. The request comprises at least information on the location of the mobile device retrieved from the NFC tag and the user ID.

In one embodiment of present system, the act of reading a NFC tag by the mobile device 100 may trigger successively the acts of installing an application as described in FIG. 2 (1) and then the acts described previously in FIG. 2 (3). In other words, the act of reading a NFC tag by the mobile device may trigger successively the acts of downloading an application, installing the application and the application sending a request to join a social network.

In FIG. 2 (4) the server receives the request from the mobile device 100 to join a social network, said request comprising at least information on the location of the mobile device and the user ID. The server gathers a timestamp associated with the received request. This could be done by associating to the request the time of arrival of the request. In another embodiment, the mobile device 100 may include within the sent request a timestamp, said timestamp could be retrieved by the server and used to gather a timestamp associated with the received request. The server retrieves the social network associated with the location of the mobile device and a time window comprising the time indicated by the timestamp, that is to say, the social network associated to the event of FIG. 2 (2). Possibly, the server 190 retrieves such information from the database 197. The server then registers the user ID in association to the retrieved social network associated to the event. From this step, the user can access the social network from its mobile device, as the user ID is registered in association with the social network.

In particular, as illustrated in FIG. 2 (6), if the user tries to access the social network from its mobile device some days after the event, meaning outside the time windows associated to the event, the access is authorized (FIG. 2 (7)) as the user ID is registered in association within the social network.

Figure 3:
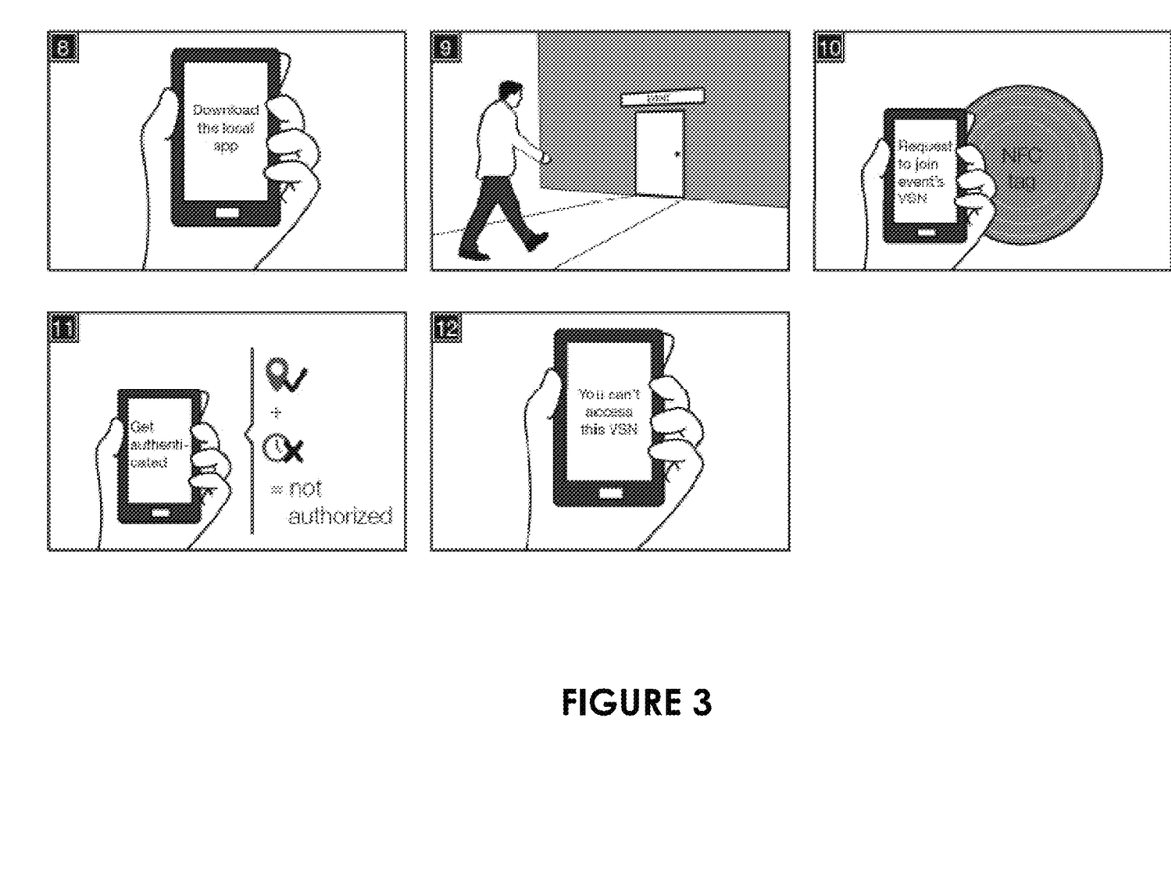
FIG. 3 shows an exemplary illustration of a use case of refusing the registration to a social network in accordance with an embodiment of the present system.

FIG. 3 shows an exemplary illustration of a use case of refusing the registration to a social network in accordance with an embodiment of the present system. The user of FIG. 3 is different from the user of FIG. 2, meaning that the mobile device used is different.

FIG. 3 (8) step is similar to FIG. 2 (1) step. In FIG. 3 (9) the user, different from the user of FIG. 2, goes to the same place as described in FIG. 2 (2), that is to say an event location such as a conference center. Ideally, as described in FIG. 2 (2), a NFC tag is installed next to the entrance of the conference center or conference room. In the situation described in FIG. 3(9), the user goes to the conference center at a time which is not within the time window associated with the social network associated with the event of FIG. 2 (2). In FIG. 3 (10), the user request to join a social network, meaning that the user's mobile device sends a request to the server to join a social network. In FIG. 3 (11), the server retrieves social networks associated with the location of the mobile device and a time window comprising the time indicated by the timestamp. This time, contrary to FIG. 2, the timestamp is not within the time window associated with the event. So, as only the location corresponds to the location associated to the social network, but not the timestamp, the user ID is not registered in association to the social network, meaning that the user is not allowed to access the social network (FIG. 3 (12)).

Figure 4:
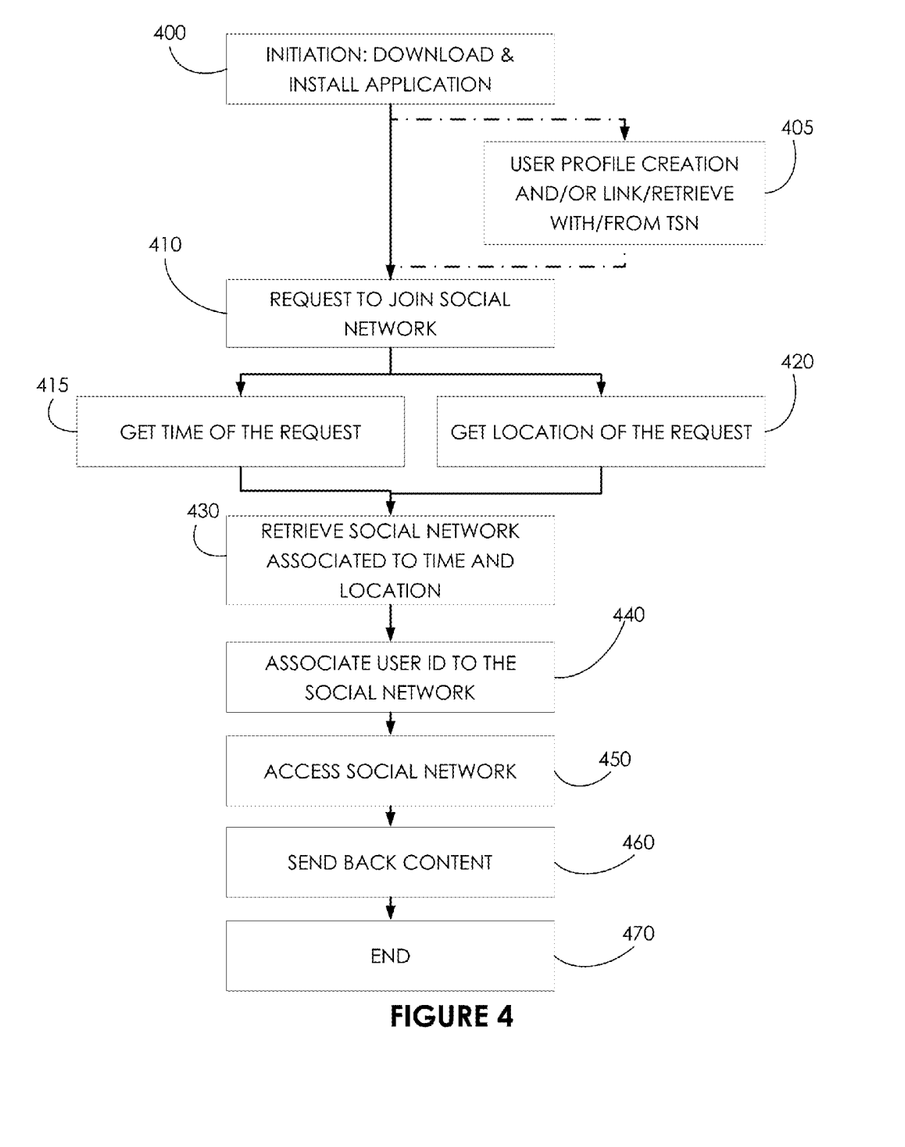
FIG. 4 shows an exemplary flowchart for managing access to a social network according to an embodiment of the present method.

FIG. 4 shows an exemplary flowchart for managing access to a social network according to an embodiment of the present method.

During a first step 400, a user with a mobile device such as described in FIG. 1A needs to install a social network application, or client, on its mobile device 100. The social network application may be retrieved from an application market such as Google Play™ or Itunes™. Alternatively, the social network application may have been pre-installed by the network operator. The social network application may be a dedicated application or may be a plug-in to an existing social network, for example an application for Facebook™ (FacebookApp™).

In the first case, the social network application will manage access to different social networks that could be seen as sub groups of the social network within the social network application. For simplicity sake such sub groups of the social network accessed by the social network application are called hereafter in the text "social networks".

In the second case, social network hereafter in the text should be understood as a subgroup within the existing social network. Thus, the social network application, in this second case a plug-in to an existing social network, will manage access to subgroups of the existing social network. For simplicity sake and coherency with previous case, such subgroups are hereafter called social networks.

For example, a social network hereafter in the text can be understood as a group within Facebook™ or LinkedIn™, group created especially in relation with an event. Access to this group can be managed by the social network plug-in, the application object of the present invention.

During installation procedure of the social network application on the mobile device 100, a user ID is associated to the mobile device. The user ID could be randomly generated when installing the social network application, could be generated from, for example, a MAC address of a Wi-Fi interface of the mobile device (if any), or it could even be entered manually by the user during the installation process, or retrieved from a file, said file being stored either locally or on a distant server.

For simplicity sake, the following description should focus on the case of a social network application, or client, as a dedicated application. The client manages the communication with a server application, said server application being hosted or executed on a server 190 as described in FIG. 1B.

In an optional step 405, the social network application may request the user to create or complete a user profile. Alternatively, the user profile may be retrieved by the application from another social network. This last option is particularly relevant when the application installed during step 400 is a plug-in to an existing social network. Once created or completed, the user profile is stored in association with the user ID on the mobile device 100 and/or sent on a database server to be stored, possibly the database server being the server 190. In other words, the user profile can be stored in database 197.

In a step 410, the mobile device 100 sends a request to join a social network to the server 190, said request comprising at least information on the location of the mobile device and the user ID. According to the embodiment of present system, the trigger to send the request the request can be different, the different option being compatible. In one embodiment, the triggering act could be the mobile device reading a NFC tag. In another embodiment, the mobile device may periodically send a request to the serve 190. In a complementary embodiment, the mobile device may send a request when detecting that the location of the mobile device has changed.

Thus, the request sent by the mobile device 100 comprises location information. Location information should be understood as information allowing the server 190 to retrieve a location using said information. In one embodiment, such location information could be the output result of a GPS module integrated in the mobile device 100. In another embodiment, the location information may be information retrieved from reading a NFC tag. Such information could be of different forms. It could be for example GPS coordinates or the name of a location, ideally the name of the location embedded in the NFC tag corresponding to the physical location of the NFC tag. Information retrieved from the NFC tag could also be presented as an ID or code.

The request sent by the mobile device 100 to the server 190 also comprises the user ID associated to the mobile device 100. As seen before, this user ID could be chosen as a fix parameter, depending only on characteristics of the mobile device 100 (e.g. MAC address of one interface of the mobile device 100 or the International Mobile Station Equipment Identity (IMEI) of the mobile device 100, or any other characteristic of mobile device 100), or it could be generated when installing the application of step 400. Alternatively, the user ID may also be a parameter defined manually by the user of the mobile device 100.

In a step 415, the server 190 gathers a timestamp associated with the received request. The timestamp could be the time at which the event of receiving the request is recorded by the server 190. Alternatively, the server 190 may retrieve the timestamp from the received request itself. In this last embodiment, the timestamp would not be the time at which the request was received by the server 190 but possibly the time at which the request was elaborated by the mobile device, or again alternatively, the time at which the request was sent by the mobile device. Indeed, time of elaboration, meaning when the mobile device 100 built the request, could be different from the time of sending the request by the mobile device 100. This is particularly true if the mobile device 100 has no network coverage (for any reason: technical incident, no network coverage at the event location, mobile device set in airplane mode) and must wait to recover network coverage to send the on-hold request. Alas, in term of security, in this case, the request may be forged by the mobile device using a forged timestamp in order to get fraudulent access to a social network.

In another embodiment, in order to get the flexibility of previous embodiment while preserving security, the act of gathering the time stamp comprises the acts of retrieving information in the received request from the mobile device, the information being gathered by the mobile device from a NFC tag and determining a time stamp from the retrieved information. Indeed, the NFC tag read by the mobile device 100 may dynamically generate a code that would be integrated in the request sent to the server. This code could be retrieved by the server 190, and from this code, the exact timing or timestamp of the reading of the NFC tag could be retrieved. This embodiment may rely on dynamic or non-passive NFC tag linked to a clock and a pre-sharing of a code between this NFC tag and the server 190. In one embodiment, the dynamic non-passive NFC tag may be connected to the server 190, the server 190 controlling the information embedded within the NFC tag. This embodiment allows an advantageous control of the information, retrieved by the mobile device 100.

In a complementary embodiment, the step 410 further comprises an act of associating a user profile to the received request from the mobile device, the user profile being associated to the user ID. The user profile can be retrieved from the database 197 as described in step 405.

In an alternative embodiment of present system, the act of reading a NFC tag by the mobile device 100 may trigger successively the acts of installing an application as described in step 400 and then the acts described previously in step 410. In other words, the act of reading a NFC tag by the mobile device may trigger successively the acts of downloading an application, installing the application and the application sending a request to a server 190 to join a social network.

In a step 420, which step can be executed before, after or at the same time as the step 415, the server 190 retrieves a location from the received request from the mobile device 100. This step 420 depends on how the mobile device 100 embedded the information on location within the sent request to the server 190. Information on the location of the mobile device comprises information gathered by the mobile device using geo-location techniques. Geo-location techniques may be typically GPS techniques. In this case, the server 190 may retrieve GPS coordinates from the received request, or possibly an ID collected by the mobile device 100, using the NFC reader 170, from a NFC tag. In this case, information on the location of the mobile device comprises information gathered by the mobile device from a NFC tag. When the location information of the request from the mobile device is gathered from a NFC tag, in the form of a collected ID, the server 190 may need to retrieve from a database, either locally, for example from database 197, or connecting to a remote database server, the location corresponding to the collected ID.

In a step 430, the server 190 retrieves, possibly from its database 197, at least one social network associated with the location of the mobile device 100 and a time window comprising the time indicated by the timestamp.

If during the step 420 the location of the mobile device 100 is retrieved in the form of a location name, for example "Conference center Millenium, room 42, Paris, France", the location associated to the social network should match somehow the location name of the mobile device 100. Matching rules are dependant upon the embodiment of the present system and may strict, exact matching of the name of the location of the mobile device and name of the location associated to a social network being requested. In another embodiment, matching of the names of the locations may obey to some rules like for example regular expression rules.

If during the step 420 the location of the mobile device 100 is retrieved in the form of GPS coordinates, the location associated to a social network could be defined as a zone. In this case, the matching of the location retrieved by the mobile device 100 and the location associated to a social network is performed by checking if the GPS coordinates corresponding to the location of the mobile device 100 are within the zone of the location associated to the social network. In another embodiment, if the location associated to a social network is defined also as GPS coordinates, the matching could be defined by measuring the distance between the two locations and comparing this distance to a threshold. Moreover, a precision factor of the retrieved location of the mobile device may be used. In this embodiment, this precision factor, i.e. a predefined distance representing an accepted error attached to the location of the mobile device or to the location associated to the social network, is removed from the distance between the GPS coordinates of the mobile device location and location associated to the social network before comparing to the threshold. When the resulting distance is below or possibly equal to the threshold, the server 190 considers that the location of the mobile device 100 corresponds to the location associated to the social network, or in other words that the two locations match.

The timestamp gathered during step 415, in association with the received request, is compared to the different time windows associated to the plurality of social networks. A social network is selected when the associated time window contains the gathered timestamp. In other words, if the time window "Apr. 1, 2013 14:00 GMT to Apr. 1, 2013 18:00 GMT" (GMT for Greenwich Mean Time) is associated to a social network, the gathered timestamp would need to belong to this time window or time interval, meaning that the timestamp should be higher than or equal to "Apr. 1, 2013 14:00 GMT" and lower than or equal to "Apr. 1, 2013 18:00 GMT". It is to be noted that a time zone (for example, GMT, UTC—Coordinated Universal Time—, UTC+4, and so on) should advantageously be associated to both the time windows and the timestamp. In some embodiment of present system, time zone may not be used, but this may potentially lead to confusion or error if the system is used across different time zones or with mobile device and server using different time settings.

The server 190 may begin by retrieving a first list of at least one social network associated with the location of the mobile device 100 and then, from this first list of retrieved social network, retrieve the social networks with an associated time window comprising the time indicated by the timestamp.

Alternatively, the server 190 may begin by retrieving a second list of at least social network with an associated time window comprising the time indicated by the timestamp and then, from this second list, retrieve the social networks associated with the location of the mobile device.

In another embodiment, the acts of retrieving the first and second lists may be executed in parallel. Thus the server 190 may retrieve at least one social network associated with the location of the mobile device 100 and a time window comprising the time indicated by the timestamp by selecting social networks belonging to both the first list (corresponding to a good location) and the second list (corresponding to a good timing).

In the step 440, the server 190 registers the user ID in association to the at least one social network retrieved in previous step 430. Said registration may comprise the act of storing the user ID in the database 197. In one advantageous embodiment of present system, the mobile device 100 will receive a notification sent by the server 190 that the user ID associated to the mobile device 100 has been registered in association with the at least one retrieved social network. Indeed, the mobile device 100 may keep track locally of social network registered in association with its user ID, allowing further quick access to these social networks.

In the step 450, access to the at least one retrieved social network is authorized to the mobile device 100. Indeed, access to a given social network from a mobile device is authorized if the user ID associated to the mobile device is registered in association to the given social network. Thus, the user, using its mobile device 100, may access anytime a social network once the registration step 440 has been successfully conducted at least one time. Like that, only people attending to a specific event, said event being defined by a certain location and time window, can possibly register and later access to a social network specially created and associated with the event.

Once access has been authorized for a user, that is to say, to the mobile device used by the user, content dedicated to said social network may be accessed by the mobile device. In other words, once access is validated, the server may send the social network to the mobile device 100 in a step 460. This content may be totally dedicated to the social network, possibly content uploaded by the users connected to said social network. In complement, content may be fetched from others social network depending on the users—i.e. information contained in the user profile—connected to the social network. In other words, the user profile associated to a user ID may contain information allowing the server 190 to fetch information from others social networks (for example login and password to access another social network).

Finally, the above discussion is intended to be merely illustrative of the present system and should not be construed as limiting the appended claims to any particular embodiment or group of embodiments. Thus, while the present system has been described with reference to exemplary embodiments, such as embodiment described in FIG. 4, it should also be appreciated that numerous modifications and alternative embodiments may be devised by those having ordinary skill in the art without departing from the broader and intended spirit and scope of the present system as set forth in the claims that follow. Further, while exemplary illustrations were provided to facilitate an understanding of the present system, other system to manage access to a social network may be provided in accordance with further embodiments of the present system. For instance, NFC tag may be replaced with a RFID tag or any contactless technology. Alternative embodiment may even replace the reading of the NFC tag by the mobile device 100 requesting the user to enter manually a code that could be written on a specific tag, or even simpler, by entering directly the name of the location, possibly offering to choose among a predefined list of locations.

The section headings included herein are intended to facilitate a review but are not intended to limit the scope of the present system. Accordingly, the specification and drawings are to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or an preceding an element does not exclude the presence of a plurality of such elements c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise;

h) no specific sequence of acts or steps is intended to be required unless specifically indicated; and i) the term "plurality of" an element includes two or more of the claimed element, and does not imply any particular range of number of elements; that is, a plurality of elements may be as few as two elements, and may include an immeasurable number of elements.

The invention claimed is:

1. A method comprising:
managing access to a social network from a mobile device, said mobile device comprising a user ID, wherein the managing is executed by a server, said server managing the accesses for a plurality of social networks, each social network being associated with a location and a time window, and wherein managing comprises:
receiving a request from the mobile device to join a social network, said request comprising at least information on the location of the mobile device and the user ID;
gathering a timestamp associated with the received request;
retrieving at least one social network associated with the location of the mobile device and a time window comprising the time indicated by the timestamp; and
registering the user ID in association to the at least one social network,
wherein the information on the location of the mobile device comprises information gathered by the mobile device from a NFC tag, which dynamically generates a code to be integrated into said request, said code being retrieved by the server to retrieve the time-stamp of the reading of the NFC tag by the mobile device.

2. The method according to claim 1, wherein further access to a given social network from the mobile device is authorized by the server if the user ID of the mobile device is registered in association to the given social network.

3. The method according to claim 1, wherein the information on the location of the mobile device comprises information gathered by the mobile device using geo-location techniques.

4. The method according to claim 1, wherein gathering the timestamp comprises acts of:
retrieving information in the received request from the mobile device, the information being gathered by the mobile device from the NFC tag, and
determining a timestamp from the retrieved information.

5. The method according to claim 1, further comprising an act of the server associating a user profile to the received request from the mobile device, the user profile being associated to the user ID.

6. The method according to claim 5, further comprising after the act of registering to a social network, the acts of:
sending a message to the mobile device, said message requesting for complementary information related to the social network,
receiving a message from the mobile device, with request information, and
associating the received information with the user profile and the social network.

7. The method according to claim 1, further including prior to the act of registering the user ID in association to the at least one social network, the acts of:
sending a list of at least some of the retrieved social network associated with the location of the mobile device to the mobile device, and
receiving a selection from the sent list of at least one social network from the mobile device,
and where the act of registering the user ID is done in association to the received selection of social network.

8. A non-transitory computer readable medium comprising an application stored thereon and executable by a processor, wherein the application configures the processor of a server to execute a method comprising:
managing access to a social network from a mobile device, said mobile device comprising a user ID, said server managing the accesses for a plurality of social networks, each social network being associated with a location and a time window, and wherein managing comprises:
receiving a request from the mobile device to join a social network, said request comprising at least information on the location of the mobile device and the user ID;
gathering a timestamp associated with the received request;
retrieving at least one social network associated with the location of the mobile device and a time window comprising the time indicated by the timestamp; and
registering the user ID in association to the at least one social network,
wherein the information on the location of the mobile device comprises information gathered by the mobile device from a NFC tag, which dynamically generates a code to be integrated into said request, said code being retrieved by the server to retrieve the time-stamp of the reading of the NFC tag by the mobile device.

9. A server managing a plurality of social networks, each social network being associated with a location and a time window, the server comprising:
- a non-transitory computer-readable medium storing a computer program; and
- a processor configured by the computer program to implement acts of:
  - receiving a request from a mobile device to join a social network, said request comprising at least information on the location of the mobile device and the user ID;
  - gathering a timestamp associated with the received request;
  - retrieving at least one social network associated with the location of the mobile device and a time window comprising the time indicated by the timestamp; and
  - registering the user ID in association to the at least one social network,
  - wherein the information on the location of the mobile device comprises information gathered by the mobile device from a NFC tag which dynamically generates a code to be integrated into said request, said code being retrieved by the server to retrieve the time-stamp of the reading of the NFC tag by the mobile device.

10. A mobile device for accessing a social network, said mobile device comprising:
- a user ID,
- a non-transitory computer-readable medium storing a computer program; and
- a processor configured by the computer program to implement acts of:
  - gathering information on the location of the mobile device from a NFC tag; and
  - sending a request to a server to join a social network, the request comprising at least the information on the location of the mobile device, a timestamp and the user ID, wherein said NFC tag dynamically generates a code to be integrated into said request, said code being retrieved by the server to retrieve the time-stamp of the reading of the NFC tag by the mobile device.

11. The mobile device according to claim 10, wherein the mobile device is configured to gather the information on the location of the mobile device using a geo-location technique.

12. The mobile device according to claim 10, the mobile device further being configured to:
- receive from the server a list of social network associated with the location of the mobile device, and
- send a selection from the list of social network received to the server.

* * * * *